(12) United States Patent
Chang et al.

(10) Patent No.: US 8,526,503 B2
(45) Date of Patent: Sep. 3, 2013

(54) OCN-BASED MOVING PICTURE DECODER

(75) Inventors: June-Young Chang, Daejon (KR); Han-Jin Cho, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1286 days.

(21) Appl. No.: 11/933,060

(22) Filed: Oct. 31, 2007

(65) Prior Publication Data
US 2008/0111820 A1 May 15, 2008

(30) Foreign Application Priority Data

Nov. 15, 2006 (KR) .................. 10-2006-0112953

(51) Int. Cl.
*H04N 11/02* (2006.01)
*H04L 12/28* (2006.01)

(52) U.S. Cl.
USPC ..................... 375/240.25; 370/254

(58) Field of Classification Search
None
See application file for complete search history.

(56) References Cited

U.S. PATENT DOCUMENTS

| 6,870,883 | B2 * | 3/2005 | Iwata ...................... 375/240.01 |
| 7,401,333 | B2 * | 7/2008 | Vandeweerd ................. 718/102 |
| 2002/0031184 | A1 * | 3/2002 | Iwata ...................... 375/240.23 |
| 2005/0147174 | A1 * | 7/2005 | Iwata ...................... 375/240.23 |
| 2005/0203988 | A1 * | 9/2005 | Nollet et al. .................. 709/201 |
| 2006/0072674 | A1 * | 4/2006 | Saha et al. ............... 375/240.25 |
| 2007/0115995 | A1 | 5/2007 | Kim et al. |
| 2010/0095303 | A1 * | 4/2010 | Archer et al. ................. 718/105 |
| 2011/0093854 | A1 * | 4/2011 | Blanc et al. .................. 718/101 |
| 2011/0310770 | A1 * | 12/2011 | Liang et al. .................. 370/254 |

FOREIGN PATENT DOCUMENTS

| KR | 1020040088526 A | 10/2004 |
| KR | 1020050085273 A | 8/2005 |
| KR | 10-2005-0119798 | 12/2005 |

OTHER PUBLICATIONS

Manho Kim et al., "MPEG-4 performance analysis for a CDMA network-on-chip," Proceedings 2005 International Conference on Communications, Circuits, and Systems, vol. 1, pp. 493-496, May 2005.

* cited by examiner

*Primary Examiner* — Gregory Sefcheck

(57) ABSTRACT

A moving picture decoder further includes a plurality of switches in a mesh configuration, and at least one On-Chip Network (OCN) arranged in a star configuration and coupled to the plurality of switches. The On-Chip Network (OCN) includes a plurality of slave modules coupled to the On-Chip Network (OCN) and arranged in a star configuration.

8 Claims, 4 Drawing Sheets

OCN-BASED MOVING PICTURE DECODER

CROSS-REFERENCE(S) TO RELATED APPLICATIONS

The present invention claims priority of Korean Patent Application No. 10-2006-0112953, filed on Nov. 15, 2006, which is incorporated herein by reference.

BACKGROUND OF THE INVENTION

1. Field of the Invention

The present invention relates to an On-Chip network (OCN) based moving picture decoder; and, more particularly, to an On-Chip network based H.264 decoder having a star-mesh mixed structure for providing a moving picture decoder based on an On-Chip Network that globally has a mesh structure and locally has a star structure in order to embody a System on Chip (SoC) corresponding to a moving picture decoder having improved data communication parallelism.

This work was supported by the IT R&D program of MIC/IITA [2005-S-077-03, "Development of On-Chip Network Based SoC Platform"].

2. Description of Related Art

According to the development of a semiconductor process technology, a System on Chip (SoC) design was introduced. The system on Chip (Soc) design is a technology that mounts a processor, a memory, and various peripheral devices on a chip. The goal of the SoC design is to integrating various verified intellectual properties on a chip so as to enable a corresponding chip to perform various functions.

In the semiconductor field, the intellectual property (IP) is defined as a semiconductor design module that is a reusable and independent function block in a semiconductor integrated circuit design. For example, the IP denotes a hardware or software functional block to form a semiconductor logic circuit.

In the SoC design, an On-Chip Network structure was introduced for enabling IPs to mutually communicate with each others. That is, the On-Chip Network structure has the same feature of a computing network.

As the OCN structure, an AMBA high performance bus of AMBA 2.0, which is a single On-Chip Bus, an advanced system bus, and an advanced peripheral bus were generally used, where AMBA stands for an advanced micro-controller bus architecture.

As described above, the AMBA supports data communication among IPs through a single shared bus. That is, the AMBA allows only one slave module to transmit/receive data to/from a master module through the single shared bus at a time. Such a way of transmitting/receiving data of the AMBA is inefficient in views of system throughput and resource utilization.

Lately, a moving picture decoder was designed based on the On-Chip network. In generally, a moving picture decoder was embodied by integrating a plurality of master modules and a plurality of slave modules on an On-chip bus based on the AMBA.

In order to satisfy various demands of a user for a moving picture decoder, it is required to integrate a plurality of master modules and slave modules on an On-Chip Network for performing different functions. As the number of master modules increases, the IP integration becomes more complicated. Particularly, the performance of a moving picture decoder abruptly deteriorates due to the bottleneck that is caused by frequency data communication among a plurality of mater modules.

In order to overcome the problem, the AMBA introduced multi-layer AHB/APB On-Chip Network. As another method, a crossbar switch was embodied on an On-Chip Network.

However, DMAC is not allowed to transmit data while a CPU generates a control signal for a predetermined slave module in the multi-layer AHB/APB On-Chip Network. That is, data transmission is delayed as long as a time that the CPU occupies a bus. The data parallelism is limited thereby.

In the crossbar switch based On-Chip Network, the data parallelism is limited by the number of master modules and the functional characteristics of a slave module. That is, a channel is not provided on a switch to transmit data between slave modules although a channel is provided to transmit data between a mater module and a slave module.

That is, the performance of an On-Chip Network based moving picture decoder depends on how to design the structure of an On-Chip Network to improve the data parallelism and how to cluster intellectual properties related to a moving picture decoding function.

Therefore, there is a demand for a technology for improving the data parallelism by dividing slave modules for transmitting and receiving data among intellectual properties, clustering the divided slave modules on an On-Chip Network, and effectively designing the structure of an On-Chip Network.

SUMMARY OF THE INVENTION

An embodiment of the present invention is directed to providing a moving picture decoder having a star-mesh structured On-Chip Network that globally has a mesh structure and locally has a star structure for embodying a System on Chip (SoC) corresponding a moving picture decoder having the improved data communication parallelism.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a moving picture decoder having an On-Chip Network (OCN) that includes a plurality of master modules and a plurality of slave modules, including: a plurality of switches for providing a parallel data transmission path between a predetermined master module and the other master module, a parallel data transmission path between a predetermined master module and a predetermined slave module, and a parallel data transmission path between a predetermined slave module and the other slave module; and a plurality of On-Chip Networks (OCNs) for providing a local parallel data transmission path between predetermined slave modules and a parallel data transmission path between a slave module in a corresponding area and the switches, wherein a OCN structure of the moving picture decoder globally has a mesh structure with the switches as medium and locally has a star structure with each of the ONCs as medium.

DESCRIPTION OF SPECIFIC EMBODIMENTS

The advantages, features and aspects of the invention will become apparent from the following description of the embodiments with reference to the accompanying drawings, which is set forth hereinafter.

The present invention relates an On-Chip Network (OCN) structure to embodying a System on Chip (SoC) corresponding to a moving picture decoder having enhanced data communication parallelism. The OCN structure according to the present invention globally has a mesh structure and locally has a star structure.

In the present invention, each of slave modules has a Mini-DMA function to operate as a master module. That is, each of the slave modules has a Mini-DMA function for directly communicating with the other intellectual properties.

Also, one slave module having a capability of processing data in parallel is divided into at least one of sub-slave modules.

That is, the Mini-DMA function is mounted in each of the slave modules, and predetermined slave modules are divided into the sub-slave modules. Then, among slave modules having a small data communication amount on an On-Chip Network, slave modules having the large amount of data communication therebetween are clustered on an On-Chip Network as the same star structure. Also, master modules, the other slave modules which are slave modules having large communication data amount on the On-Chip Network, and the star structured On-Chip Networks are clustered on the On-Chip network as a mesh structure that connects the master modules the other slave modules, and the star structured On-Chip Networks. Preferably, the star structured IP clustering and the mesh structured IP clustering are archived not to generate a collision in parallel data transmission.

Figure 1:
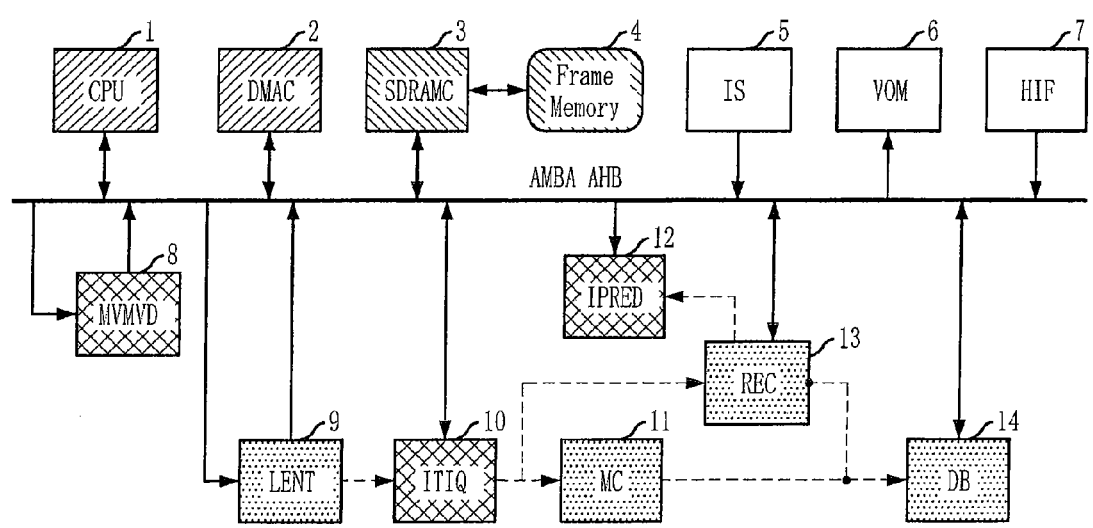
FIG. 1 is a block diagram illustrating an On-Chip Network based moving picture decoder having a general On-Chip Bus structure.

FIG. 1 is a block diagram illustrating an On-Chip Network based moving picture decoder having a general On-Chip Bus structure. That is, the OCN-based moving picture decoder of FIG. 1 is shown to describe intellectual properties such as master modules and slave modules, which are embodied on an On-Chip Network having a star-mesh mixed structure and to show how the intellectual properties communicate with each other in a moving picture decoder.

In a general OCN-based moving picture decoder, intellectual properties communicate with each other through a single On-Chip bus such as the AHB of AMBA.

The intellectual properties of the moving picture decoder includes a central processing unit (CPU) 1, for example, a 32 bit RISC CPU such as ARM7TDMI, a direct memory access controller (DMAC) 2, a SDRAM controller (SDRAMC) 3, a frame memory 4, an input stream controller (IS) 5, a video output module (VOM) 6, a host interface controller (HIF) 7, a motion vector/motion vector difference (MVMVD) 8, a low level entropy decoding (LENT) 9, an Inverse Transform/ Inverse Quantization (ITIQ) 10, a motion compensation (MC) 11, an intra prediction (IPRED) 12, a re-construction (REC) 13, and a de-blocking filter (DB) 14.

Among them, the CPU 1, the DMAC 2, and the SDRAMC 3 are the master modules, and the other intellectual properties 4 to 14 are slave modules each performing a predetermined function for moving picture decoding. Hereinafter, each of the intellectual properties will be described in brief.

The CPU 1 generates a control signal for each of the intellectual properties, for example, register setting of slave modules.

The direct memory access controller (DMAC) 2 is an intellectual property for controlling data communication among the intellectual properties based on direct memory access.

The SDRAM controller (SDRAMC) 3 controls the frame memory 4 for storing moving picture data.

The frame memory 4 stores the moving picture data.

The input stream controller (IS) 5 is a video image input stream controlling device for receiving compressed image stream from an external image input device.

The video output module (VOM) 6 outputs decoded image to an external image display device.

The host interface controller (HIF) 7 receives parameters for decoding moving pictures such as image size and image types from an external host device.

The motion vector/motion vector difference (MVMVD) 8 converts the motion vector values extracted from the MC 11 to a motion vector data value to encode the motion vector values based on variable length coding.

The low level entropy decoding (LENT) 9 performs entrophy decoding on macro blocks (MB) forming an image.

The Inverse Transform/Inverse Quantization (ITIQ) 10 divides image data by a unit of MB and inverse-transforms and inverse quantizes the divided image data.

The motion compensation (MC) 11 extracts motion vectors from image data. That is, the MC 11 controls the data generation for estimation motion and compensates the motion.

The intra prediction (IPRED) 12 estimates intra.

The re-construction (REC) 13 re-constructs an image. That is, the REC 13 constructs a current image by adding differential image data to reference image data.

The de-blocking filter (DB) 14 corrects a MB boundary.

Hereinafter, data communication among the intellectual properties in a moving picture decoder will be described.

As shown in FIG. 1, each of the slave modules 4 to 14 receives a control signal from the CPU 1 and performs a corresponding function based on the received control signal. Also, each of the slave modules 4 to 14 transmits data in response to the control of the DMAC 2. Each of the IPs may occupy the AHB On-Chip bus to transmit data or transmit data locally among the IPs.

For example, the CPU 1, the DMAC 2, and the SDRAMC 3 transmit a signal to each of the IPs through an On-Chip Bus and receive a predetermined signal through an On-Chip Bus from each of the IPs.

The IS 5, the VOM 6, the HIF 7, and the DB 14 transmit and receive a corresponding signal through an On-Chip Bus to communicate with a master module or with other slave modules.

The ITIQ 10, the MC 11, the IPRED 12, and the REC 13 do not use the On-Chip bus to communicate to each other. That is, the ITIQ 10, the MC 11, the IPRED 12, and the REC 13 directly communicate with each others. Herein, the ITIQ 10 and the REC 13 are slave modules that can process data in parallel.

The MVMVD 8 and the LENT 9 do not directly receive data from other slave modules. That is, MVMVD 8 and the LENT 9 are slave modules that receive data through an On-Chip Bus and directly transfer data to the other slave modules.

Until now, basic functions of each IP and data communication among IPs were described. In the present invention, the IPs are clustered in consideration of the feature of each IP in order to maximize the data parallelism and maximize the efficiency of the On-Chip Network.

Beside the On-Chip Bus structure shown in FIG. 1, an On-Chip network structure using a crossbar structure was introduced. Hereinafter, an OCN-based moving picture decoder having a crossbar switch will be described with reference to FIGS. 2 and 3.

Figure 2:
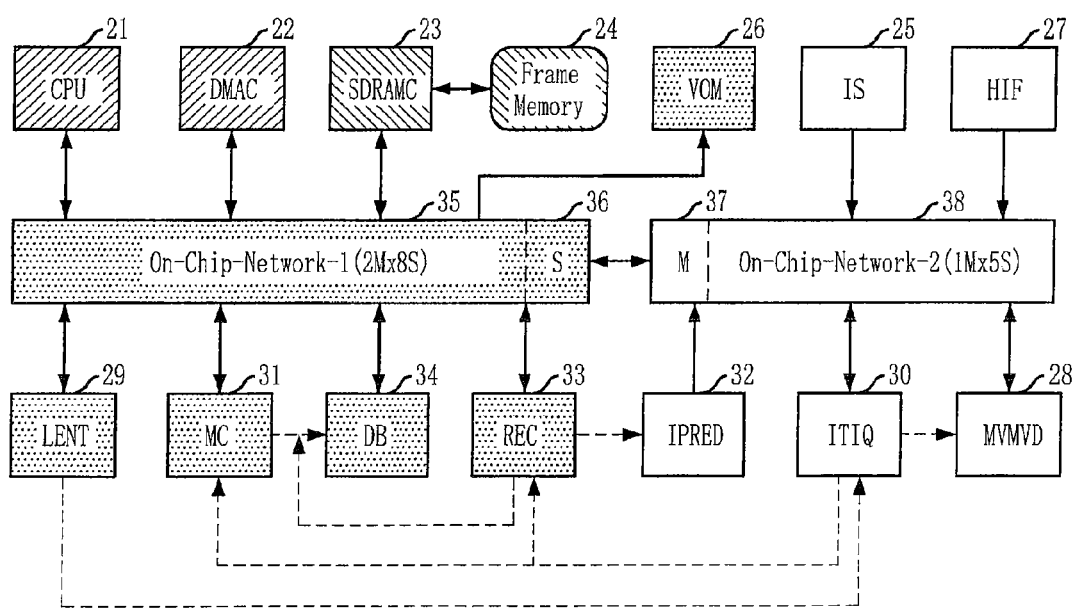
FIG. 2 is a block diagram illustrating an On-Chip Network based moving picture decoder having a general crossbar switch.
Figure 3:
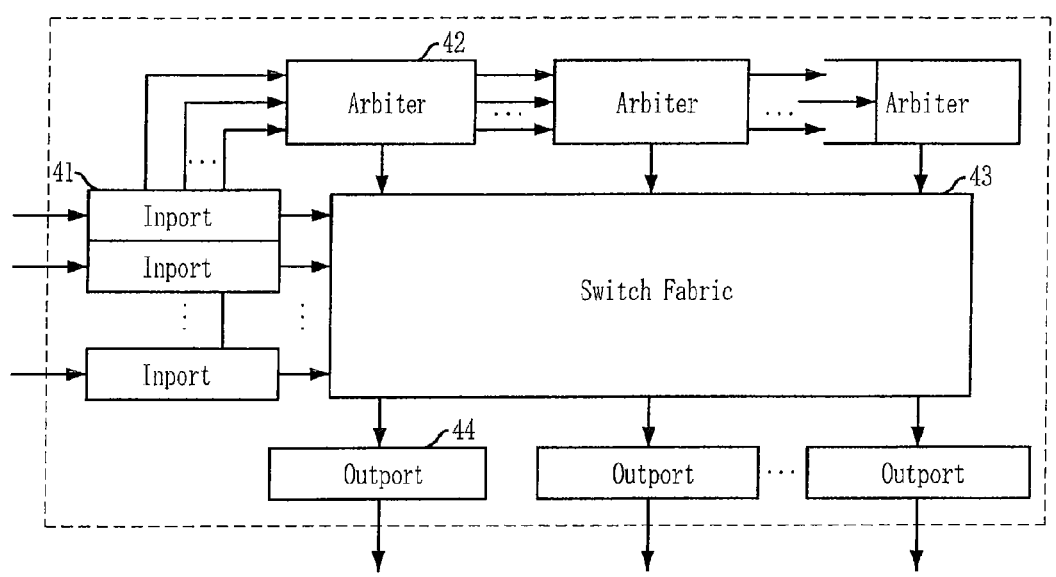
FIG. 3 is a block diagram showing a crossbar switch in FIG. 2.

FIG. 2 is a block diagram illustrating an On-Chip Network based moving picture decoder having a general crossbar switch, and FIG. 3 is a block diagram showing the crossbar switch in FIG. 2.

As shown in FIG. 2, corresponding intellectual properties (IPs) are connected based on each of crossbar switches, and the On-Chip Network has a star structure.

As shown in FIG. 3, the crossbar switch includes a plurality of inports 41, a plurality of arbiters 42, a switch fabric 43, and a plurality of outposts 44. The inport 41 is an input port that connects IPs. The outport 44 is an output port connected among IPs. The switch fabric 43 provides a data path to an input port and an output port, and the arbiter 42 arbitrates the data path.

As described above, the crossbar switch of FIG. 2 includes two On-Chip Networks for connecting 8 mater modules and 8 slave modules. The two On-Chip Networks include three master modules which are the CPU 21, the DMAC 22, and the On-Chip Network master module 37, and 13 slave modules.

In FIG. 2, the IPs are divided into two clusters according to the characteristics of the slave modules, for example, a first On-Chip Network 35 and a second On-Chip Network 38, and the divided two clusters are mapped to the corresponding IPs in order to improve the overall data communication performance.

In the On-Chip Network structure using the crossbar switch shown in FIG. 2, the DMAC 22, a master module, can transmit data using a different path between the frame memory 24 and the DB 34 while the CPU 21, the other master module, generates a control signal to the LENT 29. That is, the parallelism between two master modules is improved.

However, parts for improving the parallelism is considerably limited according to the number of master modules and the characteristics of slave modules in the moving picture decoder having the crossbar switch based On-Chip Network.

For example, the crossbar switch based On-Chip Network of FIG. 2 cannot provide a channel or a path for processing a part for transmitting data from the LEN 29 to the ITIQ 30 and the other part for transmitting data from the ITIQ 30 to the MC 31 in parallel.

As mentioned in the description of FIGS. 1 and 2, it is required to divide slave modules of transmitting and receiving data into sub-slave modules, cluster the sub-slave modules on an On-Chip network, and design the structure of On-Chip Network efficiently.

Hereinafter, an On-Chip Network based moving picture decoder having a star-mesh mixed structure according to an embodiment of the present invention will be described with reference to FIG. 4. Herein, the moving picture decoder may be a H.264 decoder.

Figure 4:
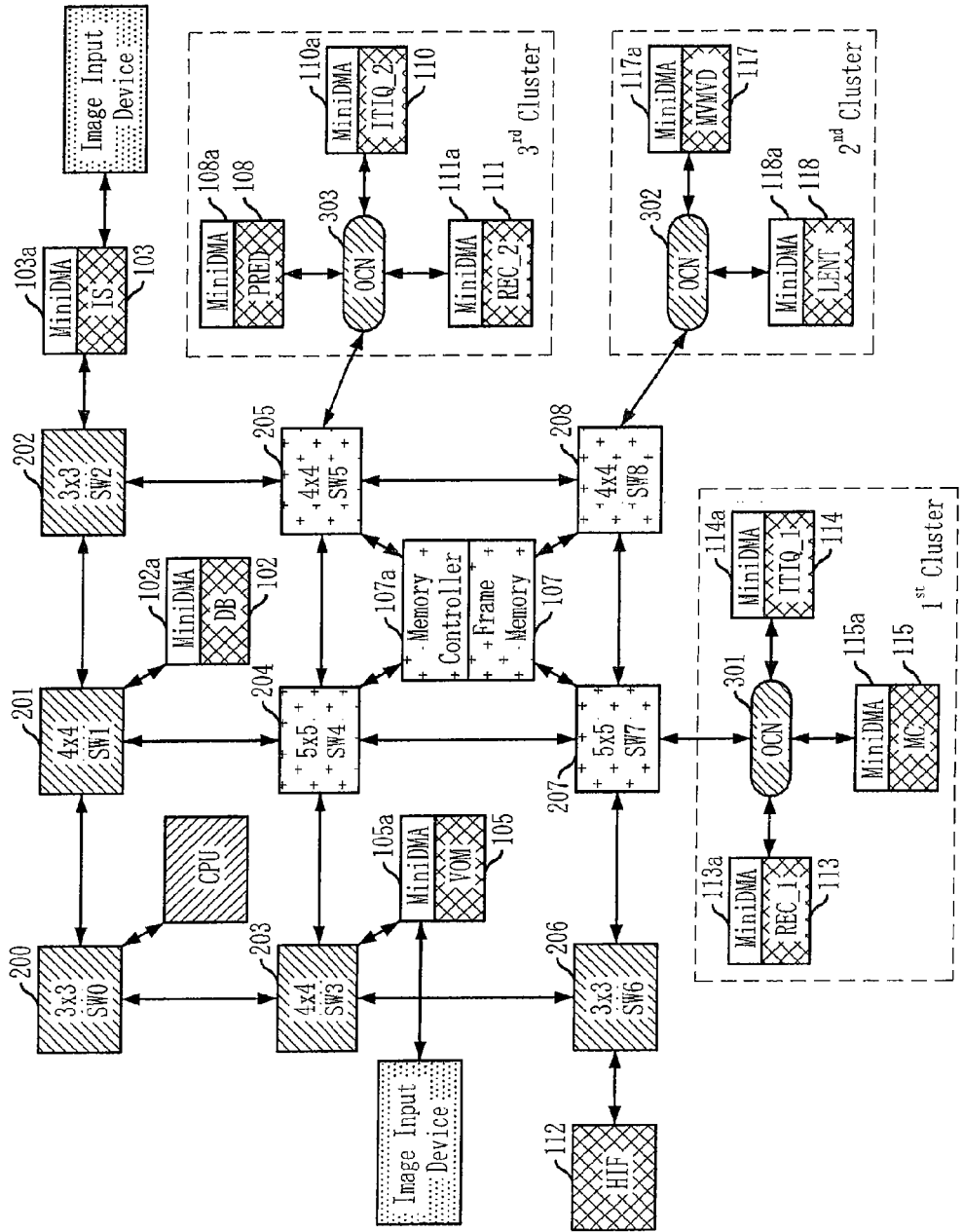
FIG. 4 is a block diagram depicting an On-Chip Network based moving picture decoder having a star-mesh mixed structure in accordance with an embodiment of the present invention.

FIG. 4 is a block diagram depicting an On-Chip Network based moving picture decoder having a star-mesh mixed structure in accordance with an embodiment of the present invention.

As shown in FIG. 4, the OCN-based moving picture decoder having a star-mesh mixed structure according to the present embodiment includes a CPU 101, a DB 102, an IS 103, a VOM 105, a frame memory 107, an IPRED 108, an ITIQ_2 110, a REC_2 111, a HIF 112, a REC_1 113, an ITIQ_1 114, a MC 115, a MVMVD 117 and a LENT 118. The OCN-based moving picture decoder having a star-mesh mixed structure according to the present embodiment further includes a plurality of switches for globally forming a mesh structured On-Chip Network, for example, a first switch 200 (3×3 SW0), a second switch 201 (4×4 SW1), a third switch 202 (3×3 SW2), a fourth switch 203 (4×4 SW3), a fifth switch 204 (5×5 SW4), a sixth switch 205 (5×5 SW5), a seventh switch 206 (3×3 SW6), an eight switch 207 (5×5 SW7), and a ninth switch 208 (4×4 SW8), and a plurality of OCNs 301, 302 and 303 for locally forming star structured On-Chip Networks such as a first cluster, a second cluster, and a third cluster.

In FIG. 4, the switches 200 to 208 provide parallel data transmission paths among OCNs corresponding to master modules, slave modules, and local star structured On-Chip Network. Also, the On-Chip Network according to the present embodiment is globally formed in a mesh structure. Basically, the switches may have 3×3, 4×4, or 5×4 structure. The present invention is not limited to the shown switch structures. Various switches may be used.

In the present embodiment, each of the slave modules has a Mini-DMA function for enabling each of the slave modules to operate as a master module. That is, each of the slave modules has the Mini-DMA function to directly communicate with other IPs.

In FIG. 4, the DB 102 has a Mini-DMA function 102a, the IS 103 has a Mini-DMA function 103a, the VOM 105 has a Mini-DMA function 105a, the IPRED 108 has a Mini-DMA function 108a, the ITIQ_2 110 has a Mini-DMA function 110a, the REC_2 111 has a Mini-DMA function 111a, the REC_1 113 has a Mini-DMA function 113a, the ITIQ_1 114 has a Mini-DMA function 114a, the MC 115 has a Mini-DMA function 115a, the MVMVD 117 has a Mini-DMA function 117a, and the LENT 118 has a Mini-DMA function 118a.

As show in FIG. 4, a slave module ITIQ is divided into the ITIQ_1 114 and the ITIQ_2 110, and the ITIQ_1 114 and the ITIQ_2 110 are clustered to be included in different OCN clusters. Also, another slave module REC is divided into the REC_1 113 and the REC_2 111, and the REC_1 113 and the REC_2 111 are clustered to be included in different OCN clusters. That is, one slave module capable of parallel data processing is divided into at least one of sub-slave modules, and one of the divided slave modules is clustered to one OCN with the other slave module that mutually communicates therewith in the present embodiment.

That is, the Mini-DMA function is mounted in each of the slave modules, and predetermined slave modules are divided into the sub-slave modules. Then, among slave modules having a small data communication amount on an On-Chip Network, slave modules having the large amount of data communication therebetween are clustered on an On-Chip Network as the same star structure. Also, master modules, the other slave modules which are slave modules having large communication data amount on the On-Chip Network, and the star structured On-Chip Networks are clustered on the On-Chip network as a mesh structure that connects the master modules the other slave modules, and the star structured On-Chip Networks.

Preferably, the star structured IP clustering and the mesh structured IP clustering are archived not to generate a collision in parallel data transmission.

Hereinafter, data transmission related to moving picture decoding in an OCN-based moving picture decoder having a star-mesh mixed structure according to an embodiment of the present invention will be described.

At first, the moving picture decoder according to the present embodiment receives compressed image from an external image input device and stores the received compressed image in the frame memory 107.

Then, the moving picture decoder according to the present embodiment reads the stored compressed image from the frame memory 107 and reads the inputted image information through the HIF 112.

The moving picture decoder according to the present embodiment divides the entire image by a MB unit with decoding information. Then, the moving picture decoder according to the present embodiment performs inverse transformation and inverse quantization on the divided images, and transfers the processed data to the MC 115.

If the moving picture decoder according to the present embodiment has a previous image, the moving picture decoder according to the present embodiment calculates a difference of the previous image and a current image and performs motion compensation at the MC 115 using the calculated difference.

Then, the REC_1 113 reconstructs the motion compensated MB.

The reconstructed MB is stored in the frame memory 107.

The DB 102 reads image data stored in the frame memory 107, performs a de-blocking process on the read image data to remove boundaries between MB blocks and stores the de-blocked image data in the frame memory 107 again.

Finally, the VOM 105 reads decoded image data and transmits the read image data to an external image output device.

In addition, the CPU 10 initializes the control register of each of the intellectual properties (IPs) to operate each of the IPs. Then, the CPU 10 transmits data of a local memory to the other IP through the Mini-DMA function.

As described above, it is possible to transmit data from the ITIQ_1 114 to the DB 102 through the MB 115 in parallel and to transmit data from the ITIQ_2 110 to the IPRED 108 through the REC_2 111 in parallel in the OCN-based moving picture decoder having a star-mesh mixed structure according to the present embodiment, which was impossible in a moving picture decoder having a crossbar switch based ONC. Therefore, data parallelism is improved, and the overall system performance is enhanced thereby.

In the present embodiment, the Mini-DMA function is mounted in each of the slave modules. Therefore, each of the slave modules can transmit data at need. That is, various data paths can be provided on the On-Chip Network. For example, while the IS 103 transmits current image data inputted from an external image input device to the frame memory 107, the VOM 105 outputs previously processed image data to an external image output device.

In the present embodiment, slave modules having a large amount of communication data therebetween are clustered as one star structure on an On-Chip Network. For example, the RECE_1 113, the ITIQ_1 114, and the MC 115 are allocated to a first cluster as the OCN 301 as a center, and the MVMVD 117 and the LENT 118 are allocated to a second cluster as the OCN 302 as a center. Also, the IPRED 108, the ITIQ_2 110, and the REC_2 111 are allocated to a third cluster as the OCN 303. Therefore, the overall system performance is improved by reducing a delay time caused by a data transmission path.

Furthermore, the OCN-based moving picture decoder having a star-mesh mixed structure according to the present embodiment processes entire image by a MB unit. Therefore, the data parallelism is improved by dividing the MB processing module to process a plurality of MB units in parallel.

For example, the OCN-based moving picture decoder having a star-mesh mixed structure according to the present embodiment has a structure of processing a second MB in the first cluster while the first MB is processed in the second cluster. Therefore, the data processing parallelism is improved.

In more detail, an image is processed in a MB unit. CIF (352×288) level image data is formed of 18×16 MB units and each MB unit has a 16×16 size. In order to process the CIF level image data in parallel, a previous MB is processed in the third cluster while a current MB is processed in the first cluster in the present embodiment.

As described above, the OCN-based moving picture decoder having a star-mesh mixed structure according to the present embodiment can solve the data delay time problem of the conventional On-Chip Bus structure or the crossbar switch based on On-Chip Network and can improve the data communication parallelism of an On-Chip Network structure supporting multiple channels.

While the present invention has been described with respect to certain preferred embodiments, it will be apparent to those skilled in the art that various changes and modifications may be made without departing from the spirits and scope of the invention as defined in the following claims.

What is claimed is:

1. A moving picture decoder comprising:
   a plurality of switches in a mesh configuration;
   a plurality of master modules and slave modules respectively coupled to each of the switches; and
   at least one On-Chip Network (OCN) coupled to each of the switches,
   wherein the On-Chip Network (OCN) includes the plurality of slave modules coupled to the On-Chip Network (OCN) and arranged in a star configuration,
   wherein the On-Chip Network (OCN) is structured globally to have the mesh configuration with the switches, and locally to have the star configuration with each of a plurality of On-Chip Networks (OCNs), and
   wherein a plurality of parallel data transmission paths are provided between the master modules, between the master modules and the slave modules, and between the slave modules by the mesh configuration and the star configuration according to the On-Chip Network (OCN) structure.

2. The moving picture decoder of claim 1, wherein the On-Chip Network (OCN) is configured of a cluster of sub-slave modules.

3. The moving picture decoder of claim 1, wherein a slave module is divided into first and second sub-slave modules,
   wherein the OCN includes first and second OCNs,
   wherein the first OCN includes the first sub-slave module coupled to the first OCN in a star configuration, and
   wherein the second OCN includes the second sub-slave module coupled to the second OCN in a star configuration.

4. The moving picture decoder of claim 3, wherein each of the first and the second OCNs is configured of a cluster of a plurality of sub-slave modules.

5. The moving picture decoder of claim 3, wherein the first and the second sub-slave modules process moving picture data by a macro block (MB) unit, and
   wherein the first and the second sub-slave modules are configured to process a predetermined MB of the moving picture data in a divided and parallel manner.

6. The moving picture decoder of claim 1, wherein each of the slave modules has a direct memory access (DMA) function so as to directly communicate with master modules or other slave modules.

7. The moving picture decoder of claim 1, the moving picture decoder further comprising at least one master module coupled to the plurality of switches.

8. The moving picture decoder of claim 1, the moving picture decoder further comprising at least one independent slave module coupled to the plurality of switches.

* * * * *